(12) United States Patent
Bardelang et al.

(10) Patent No.: US 12,313,160 B2
(45) Date of Patent: May 27, 2025

(54) DEVICE FOR POWERING A VEHICLE

(71) Applicant: Dr. Ing. h.c. F. Porsche Aktiengesellschaft, Stuttgart (DE)

(72) Inventors: Ruediger Bardelang, Kirchardt (DE); Thomas Riebl, Ditzingen (DE); Marco Kolano, Leonberg (DE); Norman Woeckel, Moensheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 149 days.

(21) Appl. No.: 18/064,300

(22) Filed: Dec. 12, 2022

(65) Prior Publication Data

US 2023/0193993 A1 Jun. 22, 2023

(30) Foreign Application Priority Data

Dec. 16, 2021 (DE) .......................... 102021133527.2

(51) Int. Cl.
*F16H 63/34* (2006.01)
(52) U.S. Cl.
CPC ................... *F16H 63/3416* (2013.01)
(58) Field of Classification Search
CPC ....... F16H 63/3416; F16H 63/34; B60T 1/005
See application file for complete search history.

(56) References Cited

U.S. PATENT DOCUMENTS

| | | | | |
|---|---|---|---|---|
| 8,282,327 | B2 * | 10/2012 | Miyagawa | ............... F16B 37/14 411/533 |
| 11,499,633 | B2 | 11/2022 | Lenke et al. | |
| 2022/0412458 | A1 | 12/2022 | Paul et al. | |

FOREIGN PATENT DOCUMENTS

| | | |
|---|---|---|
| DE | 19920095 C1 | 8/2000 |
| DE | 102018133266 A1 | 6/2020 |
| DE | 102019132506 A1 | 6/2021 |
| JP | 200983688 A | 4/2009 |
| JP | 2009109003 A | 5/2009 |
| WO | WO 2009/047636 A2 | 4/2009 |

* cited by examiner

*Primary Examiner* — Huan Le
(74) *Attorney, Agent, or Firm* — LEYDIG, VOIT & MAYER, LTD.

(57) ABSTRACT

A device including a housing, a powertrain device, a lock, and a carrier, wherein the powertrain device is arranged at least in sections in the housing, wherein the lock includes a housing element, wherein the housing includes a recess, wherein the lock is at least partially arranged in the recess and connected to the housing, wherein the lock is configured as a mechanical lock for controlled locking of the powertrain device, wherein the carrier is connected to the housing and is arranged at least in sections on an outside of the lock such that a removal of the locking device is only possible after removal of the carrier, and wherein the carrier is configured so as to enable a fastening of the device.

15 Claims, 3 Drawing Sheets

DEVICE FOR POWERING A VEHICLE

CROSS-REFERENCE TO PRIOR APPLICATION

This application claims benefit to German Patent Application No. DE 10 2021 133 527.2, filed on Dec. 16, 2021, which is hereby incorporated by reference herein.

FIELD

The invention relates to a device for powering a vehicle, and a vehicle.

BACKGROUND

DE 10 2019 132 506 A1 shows a transmission of an electric vehicle with a parking lock.

WO 2009/047 636 A2 shows a cover for protecting a parking lock actuator.

DE 199 20 095 C1 shows a device for manually locking and unlocking as well as for automatically locking a parking lock of an automatic transmission.

DE 10 2018 133 266 A1 shows a parking lock, which, with the aid of an actuator, pivots a ratchet for locking into a parking lock wheel of a transmission.

SUMMARY

In an embodiment, the present disclosure provides a device comprising a housing, a powertrain device, a lock, and a carrier, wherein the powertrain device is arranged at least in sections in the housing, wherein the lock comprises a housing element, wherein the housing comprises a recess, wherein the lock is at least partially arranged in the recess and connected to the housing, wherein the lock is configured as a mechanical lock for controlled locking of the powertrain device, wherein the carrier is connected to the housing and is arranged at least in sections on an outside of the lock such that a removal of the locking device is only possible after removal of the carrier, and wherein the carrier is configured so as to enable a fastening of the device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
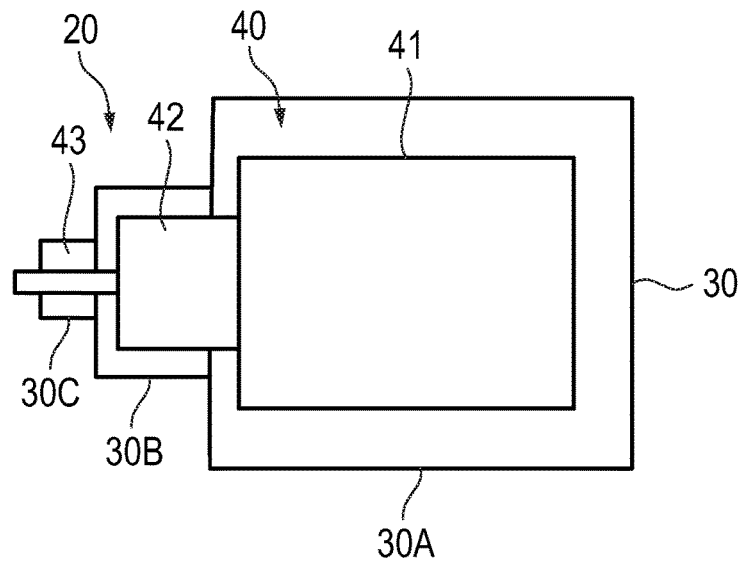
FIG. 1, in a schematic view, shows a longitudinal section through a device.

In an embodiment, the present invention provides a new device for powering a vehicle and a new vehicle.

A device has a housing, a powertrain device, a locking device, and a carrier element, which powertrain device is arranged at least in sections in the housing, which locking device comprises a housing element, which housing device comprises a recess, which locking device is at least partially arranged in the recess and connected to the housing, which locking device is configured as a mechanical locking device for controlled locking of the powertrain device, which carrier element is connected to the housing and is arranged at least in sections on the outside of the locking device in such a way that a removal of the locking device is only possible after removal of the carrier element, which carrier element is configured so as to enable a fastening of the device.

The carrier element can hereby cover the locking device and make an unwanted removal of the locking device more difficult or impossible.

According to an embodiment, the powertrain device comprises at least one powertrain element from a first group of powertrain elements consisting of:
  combustion engine,
  electric motor,
  hybrid engine.

Such engines are comparatively heavy and thus make it difficult to disassemble the carrier element carrying the load of the device. Preferably, this powertrain element is arranged at least partially in the housing.

According to an embodiment, the powertrain device comprises at least one powertrain element consisting of a second powertrain element group consisting of:
  automatic transmission,
  manual transmission,
  clutch.

These powertrain elements allow for a good locking of the powertrain device. Preferably, this powertrain element is arranged at least partially in the housing.

According to an embodiment, the minimum distance between the carrier element and the locking device is less than 5.0 cm, preferably less than 3.0 cm, further preferably less than 2.0 cm, further preferably less than 1.0 cm, and more preferably less than 0.5 cm.

This reliably prevents a disassembly of the locking device without prior disassembly of the carrier element.

According to an embodiment, at least a first fastening element is provided in order to fasten the locking device to the housing. The mounting further makes disassembly more difficult.

According to an embodiment, the carrier element comprises a protrusion extending towards the locking device in order to reduce the distance between the carrier element and the housing in the region of the protrusion compared to a configuration without the protrusion.

According to an embodiment, the locking device comprises a controllable actuator to enable mechanical locking of the powertrain device. A mechanical lock is more difficult to handle than an electronic lock.

According to an embodiment, the powertrain device comprises powertrain element parts, which powertrain element parts are configured so as to rotate during the operation of the powertrain device, and in which the locking device is configured so as to mechanically prevent the rotational movement upon activation of the locking device.

According to an embodiment, the powertrain device comprises a transmission and the locking device is configured so as to mechanically prevent a change in the position of the transmission upon activation of the locking device. This will prevent the driver from driving away in normal road traffic.

According to an embodiment, the powertrain device is provided in the housing.

A vehicle comprises such a device. Due to the compact design, the vehicle makes disassembly outside of a workshop more difficult.

Further details and advantageous further developments of the invention will emerge from the design examples, which are described below and illustrated in the drawings and are not to be construed as limiting the invention in any way. It goes without saying that the features mentioned above and those yet to be discussed below can be used not only in the respectively specified combination, but also in other combinations or on their own, without leaving the scope of the present invention.

Parts that are the same or have the same effect are provided with the same reference numerals in the following, and are usually described only once. The descriptions of all of the figures build on one another in order to avoid unnecessary repetitions. Terms such as left, right, top, and bottom are typically not absolute terms and may vary, for example, depending on the installation position or the particular view. However, it is a preferred orientation.

FIG. 1 shows a schematic diagram of a longitudinal section through a device 20, which comprises a housing 30 and a powertrain device 40. The powertrain device 40 includes powertrain elements 41, 42, 43. For example, the powertrain element 41 is an electric motor or an internal combustion engine, the powertrain element 42 is a transmission, particularly an automatic transmission or a manual transmission, and the powertrain element 43 is a shaft for transmitting torque.

By way of example, the housing 30 has a housing region 30A in which the powertrain element 41 and, in some regions, the powertrain element 42 are provided, a housing region 30B in which, in some regions, the powertrain element 42 and the powertrain element 43 are provided, and a housing region 30C through which the powertrain element 43 extends.

Figure 2:
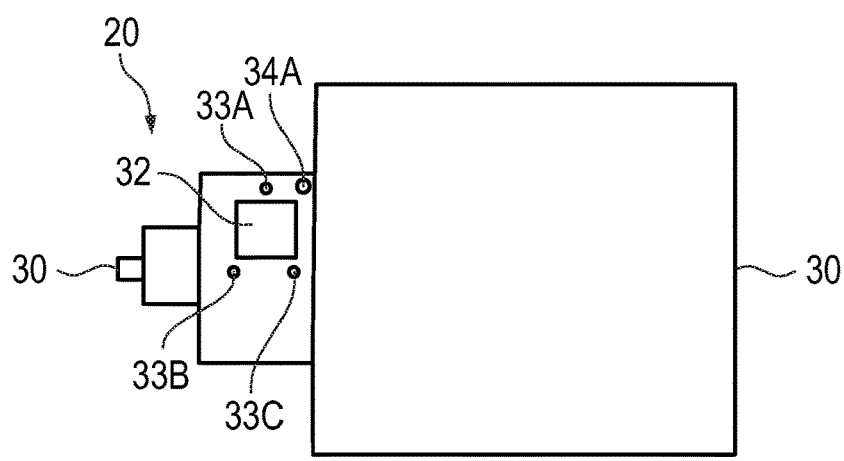
FIG. 2, in a side view, shows the device of FIG. 1.

FIG. 2 shows the device 20 of FIG. 1 in a side view. The housing 30 can be configured as a one-piece or multi-piece housing 30 and has a recess 32. Also provided are exemplary fastening elements 33A, 33B and 33C, and they are e.g. formed as internal threaded holes or threaded rods attached to the housing 30.

A further fastening element 34A is provided on the housing 30 and is configured as an internal threaded hole or as a threaded rod attached to the housing 30, for example.

Figure 3:
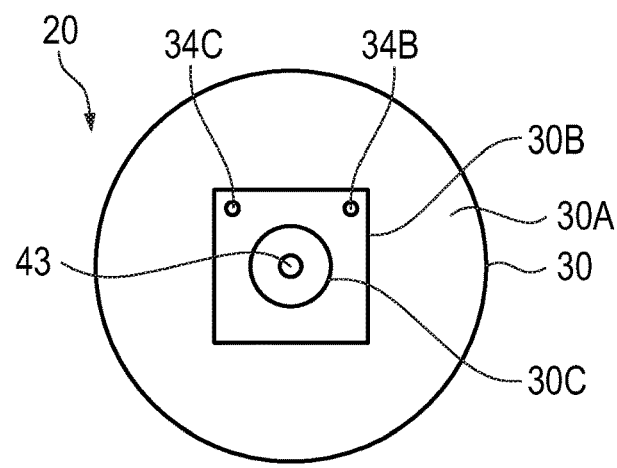
FIG. 3, in a front view, shows the device of FIG. 1.

FIG. 3 shows the device 20 from the front or, generally speaking, from the side where the shaft 43 is provided or accessible.

Further fastening elements 34B and 34C are provided on the housing 30, for example internal threaded holes or threaded rods.

Figure 4:
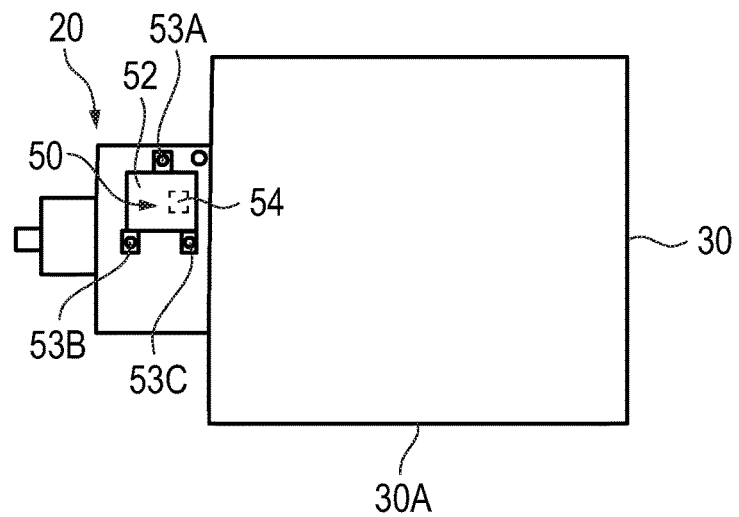
FIG. 4, in a side view, shows the device of FIG. 1 with a locking device.

FIG. 4 shows in a side view, corresponding to FIG. 2, the device 20, with a locking device 50 inserted into the recess 32. The locking device 50 is secured to the housing 30 via three fastening elements 53A, 53B, 53C that cooperate with the fastening element elements 33A, 33B, 33C. The cooperation can occur via nuts and threaded rods, for example, or via screws and internal threaded holes.

The locking device 50 has a housing element 52 that protects the locking device 50 from the outside. The housing element 52 is, for example, a cover or a partial housing. A controllable actuator 54 is indicated schematically.

The locking device 50 is provided to at least partially enable a locking or partial locking of the powertrain elements 41, 42, 43 by preventing a rotation of the shaft 43, for example, by the locking device 50. Preferably, the locking device 50 is a mechanical locking device having a mechanical element that inhibits predetermined movement of the powertrain elements 41, 42, 43. Examples of this include locking devices 50 that completely inhibit a rotation of the powertrain element 41 or 42 or 43 when activated, or, in the event of a powertrain element 42 being configured as a transmission, cause the transmission to be fixedly locked in a parking position or in reverse.

Such a locking device 50 is intended to make it particularly difficult to steal a vehicle in which the device 20 is located, and to make unauthorized use of the vehicle by driving away largely impossible. To bypass the locking device 50, a thief may attempt to remove the locking device 50 from the device 20 by unscrewing it and replacing it with a cover, for example.

The locking device 50 preferably includes an actuator in order to allow a mechanical engagement with the powertrain elements 41, 42, 43. Preferably, the locking device 20 is configured as a parking lock actuator.

Figure 5:
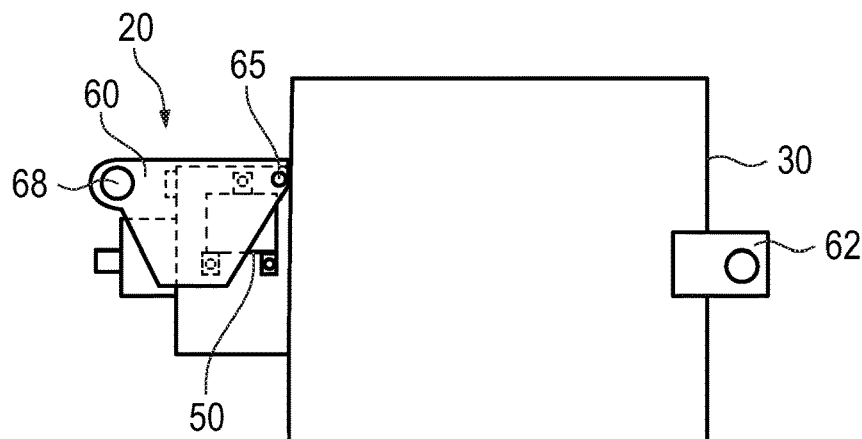
FIG. 5, in a side view, shows the device of FIG. 1 with a carrier element.

FIG. 5 shows the device 20 of FIG. 4, with an additional carrier element 60 for the device 20.

The carrier element 60 is for example bolted to the fastening element 34A of FIG. 2 by a fastening element 65, in particular a screw or nut. For example, the carrier element 60 can be secured to the device 20 via two, three, four, or five fastening elements 65.

In the right-hand region of the illustration, a carrier element 62 is provided, which also serves as the carrier element for the device 20.

In the exemplary embodiment, the carrier element 60 extends partially across the locking device 50.

The carrier element 60 has a recess 68, via which the device 20 can be supported on a vehicle-fixed part. As an alternative to the recess 68, a pin or threaded rod can also be provided on the carrier element 60 in order to allow a connection to a vehicle-fixed portion.

Figure 6:
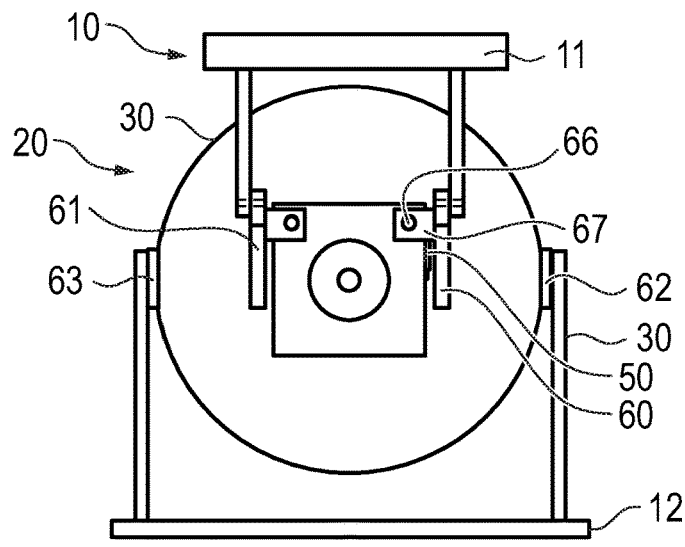
FIG. 6, in a front view, shows the device of FIG. 1 with a fastening to a console of a vehicle.

FIG. 6 schematically illustrates a vehicle 10 having a body-fixed console 11, 12 and the device 20. The device 20 is attached to the console 11, 12 via the carrier elements 60, 62 and further carrier elements 61, 63. The connection of the device 20 to the console 11, 12 takes place at the so-called marriage. Preferably, an elastic element is provided between the console 11, 12 and the body of the vehicle 10 in order to attenuate mechanical oscillations and to provide a (partial) decoupling between the device 20 and the body.

The carrier element 60 has, by way of example, a protrusion 67, and a fastening element 66 is provided for attachment. The fastening element 66 is, for example, a screw screwed into the fastening element 34B of FIG. 3 or a nut for cooperation with a threaded rod.

Due to the fact that the carrier element 60 extends across the locking device 50 in whole or in part, the locking device 50 is not accessible or only partially accessible, and a disassembly of the locking device 50 is only possible through a prior disassembly of the carrier element 60. On the one hand, the fastening elements 53A, 53B of FIG. 4 are obscured by the carrier element 60 and, in the case of screws, cannot be unscrewed. On the other hand, because the carrier element 60 is in the way, the locking device 50 cannot be pulled out of the recess 32 of FIG. 2.

It is advantageous in this respect that the carrier element 60 as a bearing element has a bearing function for the device 20 and thus cannot be simply unscrewed or disassembled without something else supporting the device 20.

Figure 7:
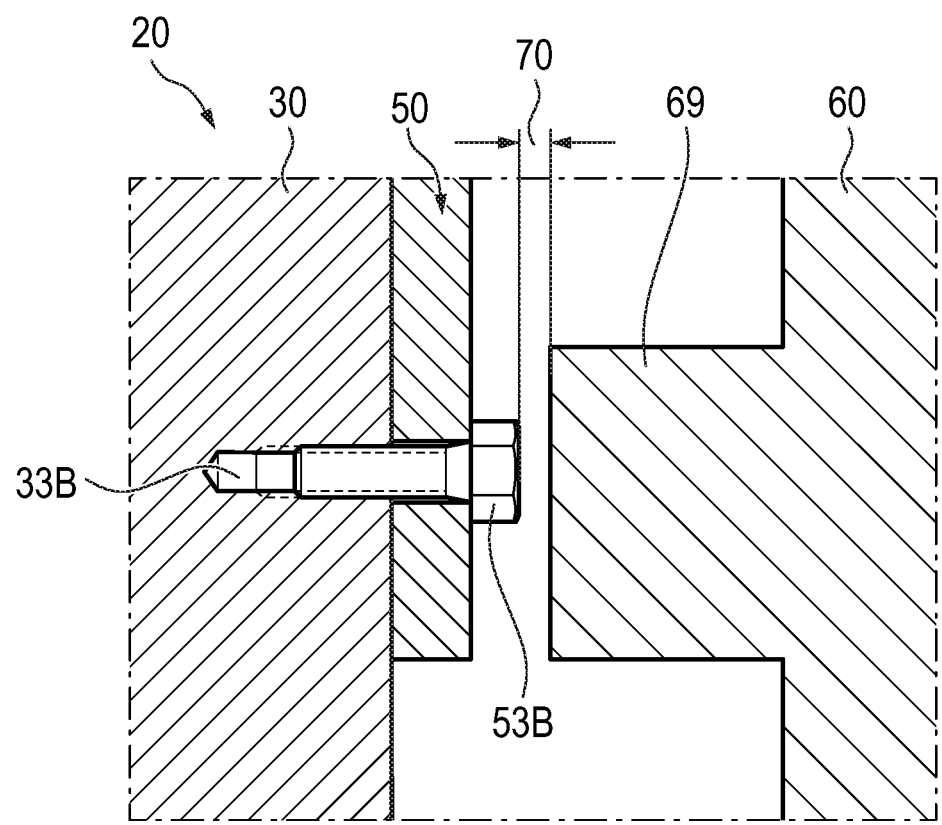
FIG. 7, in a schematic cross-sectional view, shows the device of FIG. 1 having a carrier element and a protrusion of the carrier element.

FIG. 7 shows a schematic cross-sectional view of a detail of the device 20. The housing 30 has the fastening element 33B in the form of an internal thread. The locking device 50 has a fastening region through which the fastening element 53B extends in the form of a screw. The carrier element 60 has a protrusion 69 extending towards and having a distance 70 from the fastening element 53B, which distance is relatively low or zero, such that there is contact or at least a small distance.

The distance 70 is preferably less than 5.0 cm, further preferably less than 3.0 cm, further preferably less than 2.0 cm, further preferably less than 1.0 cm, and more preferably less than 0.5 cm. The distance 70 is at least 0.0 cm, preferably at least 0.1 cm, and more preferably at least 0.3 cm. A distance 70 greater than zero is advantageous in order to enable mechanical stresses in this range in the event of an expansion caused by a temperature change.

The protrusion 69 prevents the fastening element 53B from unscrewing.

Diverse variants and modifications are of course possible within the scope of the present application.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device comprising:
    a housing;
    a powertrain device;
    a lock; and
    a carrier,
    wherein the powertrain device is arranged at least in sections in the housing,
    wherein the lock comprises a housing element,
    wherein the housing comprises a recess,
    wherein the lock is at least partially arranged in the recess and connected to the housing,
    wherein the lock is configured as a mechanical lock for controlled locking of the powertrain device,
    wherein the carrier is connected to the housing and is arranged at least in sections on an outside of the lock such that a removal of the locking device is only possible after removal of the carrier,
    wherein the carrier is configured so as to enable a fastening of the device, and
    wherein the carrier is fastened to the housing over the lock such that at least part of the lock is arranged directly between the housing and the carrier and such that the carrier at least partially covers the lock.

2. The device according to claim 1, wherein the powertrain device comprises at least one first powertrain element from the group consisting of:
    combustion engine,
    electric motor, and
    hybrid engine.

3. The device according to claim 1, wherein the powertrain device comprises at least one second powertrain element from the group consisting of:
    automatic transmission,
    manual transmission, and
    clutch.

4. The device according to claim 1, wherein a minimum distance between the carrier and the lock is less than 5.0 cm.

5. The device according to claim 4, wherein the minimum distance between the carrier and the lock is less than 3.0 cm.

6. The device according to claim 4, wherein the minimum distance between the carrier and the lock is less than 2.0 cm.

7. The device according to claim 4, wherein the minimum distance between the carrier and the lock is less than 1.0 cm.

8. The device according to claim 4, wherein the minimum distance between the carrier and the lock is less than 0.5 cm.

9. The device according to claim 1, wherein at least one first fastening element is provided in order to fasten the lock to the housing.

10. The device according to claim 1, wherein the lock comprises a controllable actuator in order to enable a mechanical locking of the powertrain device.

11. The device according to claim 1, in which the powertrain device comprises powertrain element parts, wherein the powertrain element parts are configured so as to rotate during operation of the powertrain device, and wherein the lock is configured so as to mechanically prevent rotational movement upon activation of the locking device.

12. The device according to claim 1, wherein the powertrain device comprises a transmission, and wherein the lock is configured so as to mechanically prevent a change in position of the transmission upon activation of the locking device.

13. The device according to claim 1, wherein the powertrain device is provided in the housing.

14. The vehicle comprising a device according to claim 1.

15. A device comprising:
    a housing;
    a powertrain device;
    a lock; and
    a carrier,
    wherein the powertrain device is arranged at least in sections in the housing,
    wherein the lock comprises a housing element,
    wherein the housing comprises a recess,
    wherein the lock is at least partially arranged in the recess and connected to the housing,
    wherein the lock is configured as a mechanical lock for controlled locking of the powertrain device,
    wherein the carrier is connected to the housing and is arranged at least in sections on an outside of the lock such that a removal of the locking device is only possible after removal of the carrier,
    wherein the carrier is configured so as to enable a fastening of the device, and wherein the carrier comprises a protrusion, and wherein the protrusion extends in a direction of the locking device in order to reduce a distance between the carrier and the housing in a region of the protrusion.

* * * * *